US012769260B2

(12) United States Patent
Martin

(10) Patent No.: US 12,769,260 B2
(45) Date of Patent: Oct. 20, 2026

(54) TIMEPIECE WITH TACTILE CONTROL COMPRISING AN ANTI-FOG DEVICE

(71) Applicant: The Swatch Group Research and Development Ltd, Marin (CH)

(72) Inventor: Jean-Claude Martin, Montmollin (CH)

(73) Assignee: The Swatch Group Research and Development Ltd, Marin (CH)

( * ) Notice: Subject to any disclaimer, the term of this patent is extended or adjusted under 35 U.S.C. 154(b) by 238 days.

(21) Appl. No.: 18/766,918

(22) Filed: Jul. 9, 2024

(65) Prior Publication Data

US 2025/0021056 A1 Jan. 16, 2025

(30) Foreign Application Priority Data

Jul. 10, 2023 (EP) .................................... 23184372

(51) Int. Cl.
*G04G 17/06* (2006.01)
*G04G 19/06* (2006.01)

(52) U.S. Cl.
CPC ............. *G04G 17/06* (2013.01); *G04G 19/06* (2013.01)

(58) Field of Classification Search
CPC ...... G04G 17/06; G04G 19/06; G04B 39/002; G04B 39/02; G04B 37/02; H05B 3/84
See application file for complete search history.

(56) References Cited

U.S. PATENT DOCUMENTS

2011/0126345 A1* 6/2011 Matsumoto ............ G02C 11/08 2/435
2018/0070468 A1* 3/2018 Yanagisawa ........... G04G 17/04
2020/0037401 A1* 1/2020 Chi .......................... H05B 3/06
2021/0382328 A1* 12/2021 Ono ........................ G02C 11/08
2022/0390898 A1* 12/2022 Willemin ............... G04B 19/30

FOREIGN PATENT DOCUMENTS

| | | | |
|---|---|---|---|
| CH | 703 966 | B1 | 4/2015 |
| CN | 113015399 | A | 6/2021 |
| GB | 2553198 | A | 2/2018 |
| JP | 2018-179664 | A | 11/2018 |

OTHER PUBLICATIONS

European Search Report issued Nov. 30, 2023 in European Application 23184372.3 filed on Jul. 10, 2023, 4 pages (with English Translation of Categories of Cited Documents).

* cited by examiner

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A timepiece includes a case forming an electrical mass, the case being closed by a back and a protective glass, a tactile control device connected to an electronic unit configured to execute at least one predetermined function of the timepiece, the tactile control device includes at least one capacitive sensor having a first armature formed by a transparent conductive electrode, formed at least on a portion of an internal face of the protective glass, and a second armature formed selectively by the positioning of the finger of the wearer of said timepiece on an external face of the protective glass. The transparent conductive electrode is electrically connected to the electronic unit by a first electrical conductor. The timepiece includes an anti-fog device of the protective glass formed in part by the transparent conductive electrode and by a second electrical conductor, the electronic unit includes an electric current management module.

12 Claims, 1 Drawing Sheet

TIMEPIECE WITH TACTILE CONTROL COMPRISING AN ANTI-FOG DEVICE

CROSS-REFERENCE TO RELATED APPLICATIONS

This application claims the benefit of priority from prior European Application No. 23184372.3 filed Jul. 10, 2023, the entire contents of which is incorporated herein by reference.

TECHNICAL FIELD OF THE INVENTION

The present invention relates to a timepiece with tactile control having an anti-fog device to avoid or limit the formation of fog, or fine water droplets, on the inner surface of the protective glass.

TECHNOLOGICAL BACKGROUND

Timepieces are worn on a daily basis in environments that vary greatly in terms of relative humidity, pressure and temperature. A timepiece structurally prevents humidity from penetrating the main body, but is subject to gaseous exchanges between the interior of the main body and the outside environment, and that being so, despite being watertight.

This gas exchange, known as permeation, takes place throughout the seals, which are mostly made of polymer materials with variable, but never zero, permeation properties. Hence, in very hot and humid environments, water vapour can regularly penetrate a timepiece, which in itself is not a problem because it is invisible to the user as long as there is no visible fog on the inner face of the protective glass.

Fogging most often occurs when the temperature perceived by the wearer drops, for example when swimming or entering an air-conditioned environment where the temperature is several degrees lower than before. Since the protective glass is the point of closest contact with the outside environment, fine droplets of water formed by condensation naturally adhere to the inner surface of the protective glass. The wearer notices the presence of fogging inside the timepiece and often mistakenly thinks that his/her product is no longer waterproof. This phenomenon is the source of numerous market returns, but also of a loss of confidence among users, and therefore of a deterioration in the image of the watch brand.

There are hydrophilic treatments consisting in applying a surface-active agent on the inner surface of the protective glass in order to avoid fine droplets of water adhering to the surface of the protective glass. Indeed, these hydrophilic layers enable the water to spread over the entire inner surface of the protective glass and therefore remain invisible to the wearer. However, these hydrophilic layers are not always compatible with good aesthetics (colouring, scattering effect, etc.).

Another method is based on the principle of absorption of the water contained in the vapour entering the timepiece. Nonetheless, these solutions are limited in time and the absorption capacities are limited (in quantity). Consequently, these solutions are not fully satisfactory.

Hence, there is a need to improve the anti-fogging capability of protective glass and of timepieces equipped with such a protective glass, in particular when the timepiece comprises a tactile control interface enabling the user to perform functions by interacting with a screen via the protective glass. The presence of fog on this type of timepiece is not acceptable to the user.

SUMMARY OF THE INVENTION

To this end, the present invention provides a solution to the problems of the prior art.

In this context, the invention provides a timepiece comprising a case forming an electrical mass, said case being closed by a back and by a protective glass, said timepiece comprising a tactile control device connected to an electronic unit configured to execute at least one predetermined function of said timepiece under the action of the tactile control device, said tactile control device comprising at least one capacitive sensor comprising a first armature formed by a transparent conductive electrode, formed at least on a portion of an internal face of the protective glass, and a second armature formed selectively by the positioning of the finger of the wearer of said timepiece on an external face of the protective glass; said transparent conductive electrode being electrically connected to said electronic unit by a first electrical conductor.

The timepiece according to the invention also comprises an anti-fog device for said protective glass consisting in part of said transparent conductive electrode and of a second electrical conductor connecting said transparent conductive electrode to said electronic unit in a closed circuit, said electronic unit comprising an electric current management module configured to generate a controlled electric current in the closed circuit enabling said transparent conductive electrode to heat up by Joule effect.

The electric current generated in the closed circuit by the electric current management module may be triggered by various parameters and information, for example originating from various additional sensors in the timepiece.

For example, based on information relating to its use, its internal humidity, its internal and/or external temperature, or simply at regular intervals, the anti-fog device according to the invention may be put into operation without any user intervention.

The timepiece according to the invention comprises an easy-to-use anti-fog device to avoid the formation of fog on the inner surface of the protective glass or to limit/reduce the presence of visible fog following a major thermal shock.

Besides the features mentioned in the previous paragraph, the timepiece according to the invention may have one or more complementary feature(s) from among the following ones, considered individually or in any technically-feasible combination:

- said transparent conductive electrode is a layer of transparent conductive oxides;
- said transparent conductive electrode comprises a layer of transparent conductive oxides and at least one layer for optical compensation of said layer of transparent conductive oxides;
- the layer of transparent conductive oxides is composed of tin-doped indium oxide, aluminium-doped zinc oxide, zinc oxide or fluorine-doped tin dioxide;
- alternatively, said transparent conductive electrode is a layer based on silver nanowires;
- alternatively, said transparent conductive electrode is a layer based on carbon nanotubes;
- the electric current management module is configured to generate and/or modulate a controlled electric current for heating the transparent conductive electrode as a function of at least one piece of information originating from at least one sensor that the timepiece comprises;

- the timepiece comprises an accelerometer connected to the electronic unit enabling information on the use of the timepiece to be supplied to the electric current management module;
- the timepiece comprises a temperature sensor connected to said electronic unit enabling information on the internal temperature of said timepiece and/or on the temperature of the environment outside the timepiece to be supplied to the electric current management module;
- the timepiece comprises a humidity sensor connected to said electronic unit enabling information on the humidity inside said timepiece to be supplied to the electric current management module;
- said tactile control device comprises an array of capacitive sensors covering the internal face of the protective glass, said anti-fog device being formed by at least part of the transparent conductive electrodes of the array of capacitive sensors, said at least part of the transparent conductive electrodes of the array of capacitive sensors forming the anti-fog device, being connected to the electronic unit by a first electrical conductor and by a second electrical conductor to form a plurality of closed electrical circuits, the electric current management module being configured to generate a controlled electric current in each closed circuit of the plurality of closed electrical circuits enabling said at least one part of the transparent conductive electrodes of the capacitive sensor array to heat up by Joule effect.

BRIEF DESCRIPTION OF THE FIGURES

The aims, advantages and features of the present invention will become apparent from the detailed description below with reference to the following figures.

In all figures, common elements bear the same reference numerals unless specified otherwise.

DETAILED DESCRIPTION OF THE INVENTION

Figure 1:
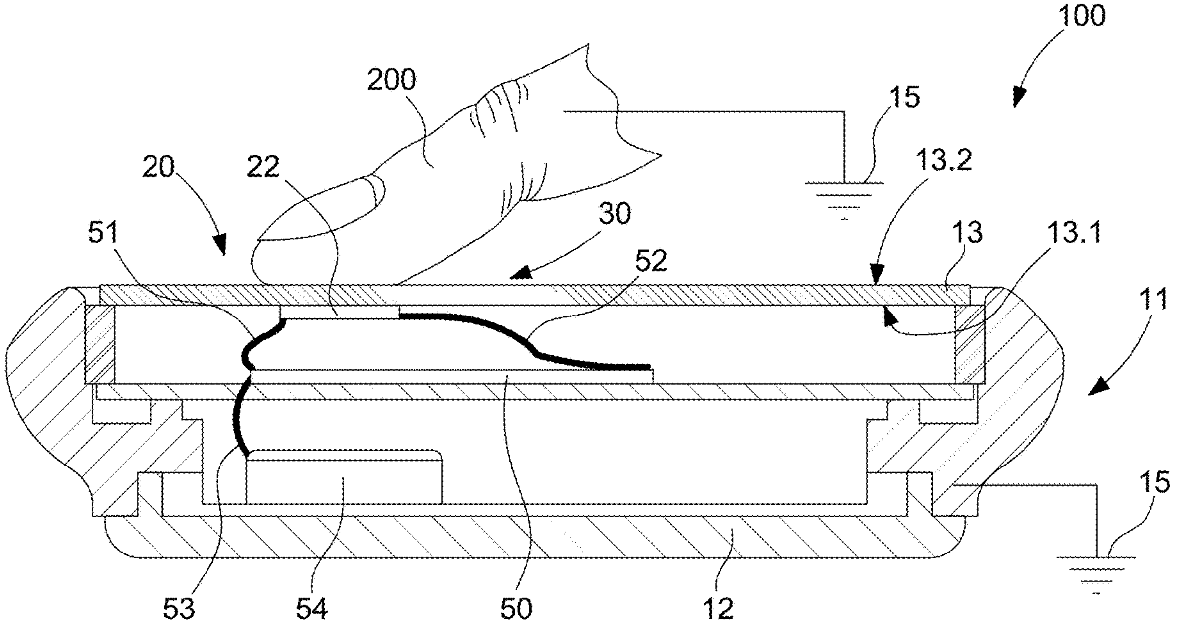
FIG. 1 schematically shows a sectional view of a tactile timepiece incorporating an anti-fog device according to the invention.

FIG. 1 schematically shows a sectional view of a timepiece 100 according to the invention comprising a tactile control device 20 and an anti-fog device 30.

Figure 2:
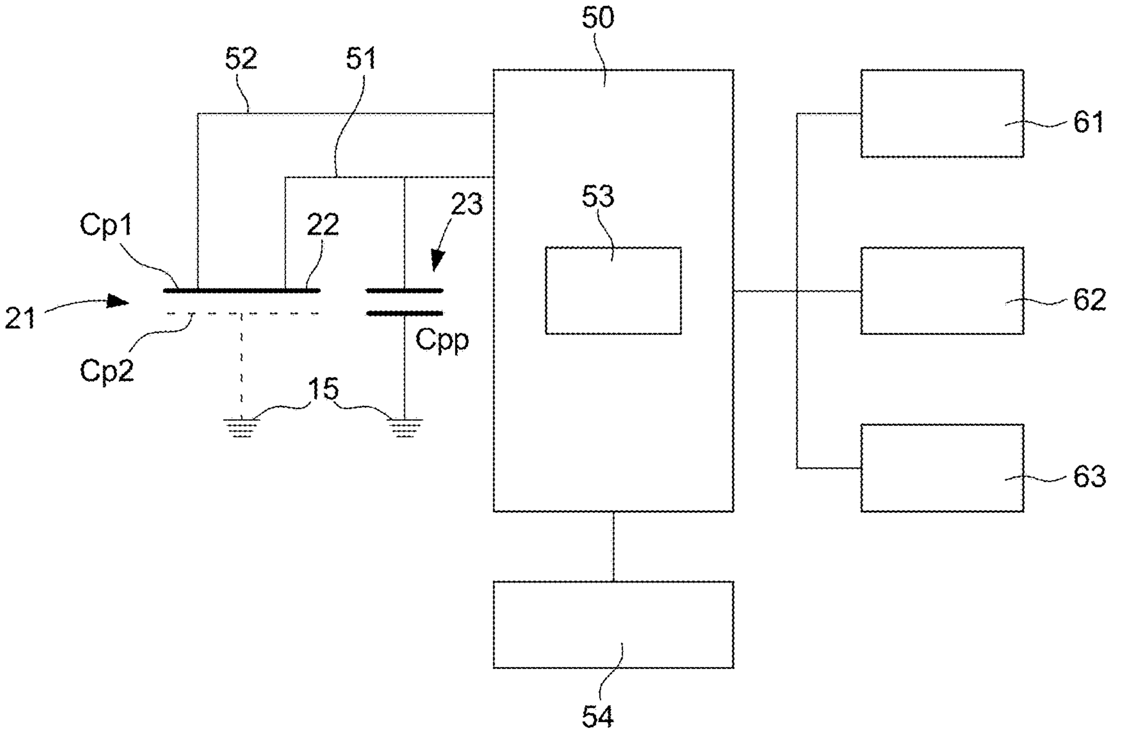
FIG. 2 shows a block diagram of the tactile control device and the anti-fog device of the timepiece according to the invention.

FIG. 2 shows a block diagram illustrating the electronic means of the tactile control device 20 and the anti-fog device 30 of the timepiece 100 according to the invention.

The timepiece 100, such as a wristwatch, is intended to be worn in contact with the skin of the user, for example on the wrist.

The timepiece 100 comprises a case intended to receive a horological movement (not shown). The movement may be electromechanical or electronic.

The case 11 is closed at the lower portion by a back 12 and at the upper portion by a protective glass 13, so as to protect the horological movement and the different elements integrated into the case 11.

The case 11 and/or the back 12 are made, at least in part, from an electrically-conductive material and thus form a reference electrical potential, for example an electrical ground 15, on contact with the skin of the wearer.

The timepiece 100 also comprises a flexible or articulated wristlet (not shown), two ends of which are intended to be coupled, for example removably, to the case 11, via an ad hoc fastening system which will not be detailed in this application, enabling the user to wear the timepiece 100, for example on the wrist, and to have the external surface of the back 12 in contact with the skin of the wearer.

The timepiece 100 comprises an electronic unit 50 located in the case 11 and connected to the tactile control device 20.

The tactile control device 20 comprises at least one capacitive sensor 21 having a first armature Cp1 consisting of a transparent conductive electrode 22 arranged at least on a portion of the internal face 13.1 of the protective glass 13.

Preferably, the transparent conductive electrode 22 covers a large portion of the internal face 13.1 of the protective glass 13, and even more preferably, the entire internal face 13.1.

The transparent conductive electrode 22 is connected to the electronic unit 50 by a first electrical conductor 51. This first electrical conductor 51 connects a first end of the transparent conductive electrode 22 to the electronic unit 50.

The timepiece 100 incorporates an electrical energy source 54, for example a rechargeable battery, which is connected to the positive pole of the electronic unit 50 by a conductor 53.

A second armature Cp2 of the capacitive sensor 21 is formed by the finger 200 of the wearer of the timepiece 100 when it is positioned on the external face 13.2 of the protective glass 13 opposite the transparent conductive electrode 22, in order to make a tactile command to execute a predetermined function of the timepiece 100.

The finger 200 of the wearer is connected to the reference electrical potential, for example to the ground 15 of the electronic unit 50, like the entire body of the wearer, via the case 11 and/or the back 12 which is in contact with the wrist of the wearer and which is connected to the negative poles of the electronic unit 50 and the electrical energy source 54.

By design, a parasitic capacitance Cpp is present between the transparent conductive electrode 22 and its environment. This parasitic capacitance Cpp is illustrated in FIG. 2 by a capacitor 23 which is connected in parallel with the capacitive sensor 21, between the first electrical conductor 51 and the reference electrical potential, for example the ground 15.

When the finger 200 of the wearer is not placed on the external face 13.2 of the protective glass 13, the capacitive sensor 21 is not formed and the control unit 50 detects the parasitic capacitance Cpp of the capacitor 23.

When the finger 200 of the wearer is placed on the external face 13.2 of the protective glass 13, the second armature Cp2 of the capacitive sensor 21 is formed (in parallel with the parasitic capacitance), the electronic unit 50 detects a total capacitance equivalent to the capacitance of the capacitive sensor 21 (predominant) added to the parasitic capacitance Cpp, the detection of this variation in capacitance allows achieving a predetermined function of the timepiece.

Since the operation of this type of capacitive sensor is well known, there is no need to describe it further.

For example, the transparent conductive electrode 22 is a layer of transparent conductive oxides (TCO).

Preferably, the layer of transparent conductive oxides is deposited over the internal face 13.1 of the protective glass 13 by a chemical vapour deposition (CVD) process or by a physical vapour deposition (PVD) process. Nonetheless, other thin film deposition methods known to the person skilled in the art are also possible.

For example, the transparent conductive electrode 22 is a layer of transparent conductive oxides composed of tin-doped indium oxide, aluminium-doped zinc oxide, zinc oxide or fluorine-doped tin dioxide.

The transparent conductive electrode 22 may also comprise at least one optical compensation layer with an optical index adapted to make the layer of transparent conductive oxides even more transparent, the structuring of the transparent conductive oxides to form an independent electrode tending to make the layer slightly less transparent. As this type of optical compensation is widely known, it is not necessary to describe it further.

According to one variant, the transparent conductive electrode 22 is a layer based on silver nanowires.

According to one variant, the transparent conductive electrode 22 is a layer based on carbon nanotubes.

The timepiece 100 also comprises an anti-fog device 30 on the protective glass 13 allowing avoiding the formation of fog on the internal face 13.1, i.e. the face opposite the watch movement, or limiting/reducing the presence of visible fog following a major thermal shock.

The anti-fog device 30 is an active device requiring a power source for operation thereof.

Advantageously, the anti-fog device 30 uses the thermal properties and electrical conduction properties of said at least one transparent conductive electrode 22 already in place in the timepiece 100 to ensure that the protective glass 13 is brought to temperature, thereby preventing the formation of fog.

Consequently, the anti-fog device 30 is formed in part by the transparent conductive electrode 22 and comprises a second conductor 52 connecting a second end of the transparent conductive electrode 22 to the electronic unit 50 so as to form a closed electrical circuit comprising the transparent conductive electrode 22, the two electrical conductors 51, 52 and the electronic unit 50.

The anti-fog device 30 comprises connection/disconnection means for electrically connecting/disconnecting the second end of the transparent conductive electrode 22 of the electronic unit 50. For example, these connection/disconnection means consist of electronic means on-board the electronic unit 50. These connection/disconnection means allow ensuring optimum sensitivity of the tactile interface when the anti-fog device 30 is not active.

For example, when the tactile control interface is used, the connection/disconnection means receive information from the capacitive sensor 20 and deactivate the electrical link between the second end of the transparent conductive electrode 22 and the electronic unit 50.

For example, the electrical link between the second end of the transparent conductive electrode 22 and the electronic unit 50 is deactivated by default, enabling the user to access the tactile interface of the timepiece 100 as required.

For example, the electronic unit 50 comprises means for programming at regular intervals, for example twice a day, and as long as the tactile interface is not in use, the automatic and regular activation of the electrical link between the second end of the transparent conductive electrode 22 and the electronic unit 50 for a given period of time, for example in the range of ten seconds, in order to reduce, and even eliminate, possible fogging on the internal face of the protective glass 13.

For example, the electrical link between the second end of the transparent conductive electrode 22 and the electronic unit 50 may be activated following receipt of information from an additional sensor on the timepiece 100 indicating a change of state resulting from a risk of fog formation or fog formation.

The anti-fog device 30 also comprises an electric current management module 53 integrated into the electronic unit 50 of the timepiece 100, configured to generate a controlled electric current in the closed electrical circuit enabling the transparent conductive electrode 22 to be heated by Joule effect.

Thus, the timepiece 100 can create regulated and controlled active heating of the protective glass 13 to prevent fogging, while at the same time enabling making of a tactile control device =.

The electric current generated by the electric current management module 53 in the closed electric circuit may be triggered and modulated by various parameters and information, for example originating from different sensors in the timepiece.

For example, the transparent conductive electrode 22 may be heated at regular intervals, in combination or alternatively with information originating from at least one additional sensor present in the timepiece.

The electric current management module 53 can also detect, via the tactile control device 20, a sudden change in the capacitive values of the capacitive sensor 21 due to the presence of condensed water and heat up the transparent conductive electrode 22 as soon as a given value is reached.

For example, the timepiece 100 may comprise an accelerometer 61 connected to the electronic unit 50. Such an accelerometer 61 allows providing the electric current management module 53 with information on the movements of the timepiece 100 and therefore on whether or not the timepiece 100 is being used by the wearer. Thus, it is possible to trigger the heating of the protective glass 13 only when the watch is being worn, thereby avoiding unnecessary energy consumption.

For example, additionally or alternatively, the timepiece 100 may comprise a temperature sensor 62 connected to the electronic unit 50. Such a temperature sensor allows providing the electric current management module 53 with information on the internal temperature of said timepiece 100 and/or on the temperature of the outside environment. For example, a setpoint temperature may be defined to trigger heating of the transparent conductive electrode 22 by current generation, and therefore of the protective glass 13.

For example, additionally or alternatively, the timepiece 100 may comprise a humidity sensor 63 connected to the electronic unit 50. Such a humidity sensor integrated into the case 11 allows providing the electric current management module 53 with information on the humidity inside said timepiece 100. Thus, a setpoint humidity level may be defined to trigger heating of the transparent conductive electrode 22 by current generation, and therefore of the protective glass 13.

The electric current management module 53 is configured to modulate the electric current for heating the transparent conductive electrode 22 as a function of the different information from the different sensors present in the timepiece, in order to optimise the consumption of the anti-fog device 30.

The tactile control device 20 may comprise a plurality of capacitive sensors 21 and therefore a plurality of transparent conductive electrodes 22 on the internal face 13.1 of the protective glass 13, thus forming an array of capacitive sensors 21. Advantageously, such an array allows activating different functions selectively, or detecting sequences of movements of the finger 200 of the wearer (sliding horizontally, sliding vertically, combination of activation of two or more sensors simultaneously, etc.).

In such an embodiment, at least some of the transparent conductive electrodes 22 of the capacitive sensor array 21 are then used by the anti-fog device 30 according to the invention.

In this case, at least some of the transparent conductive electrodes 22 of the capacitive sensor array 21, forming a first selection, are connected to the electronic unit 50 by a first conductor 51 and by a second conductor 52 to form a plurality of closed electrical circuits and enable the transparent conductive electrodes 22 forming the first selection to heat up by Joule effect.

It is also possible to provide for another part of the transparent conductive electrodes 22 of the capacitive sensor array 21, forming a second selection different from the first selection, also connected to the electronic unit 50 by a first conductor 51 and by a second conductor 52 to form a second plurality of closed electrical circuits and enable the transparent conductive electrodes 22 forming the second selection to heat up by Joule effect.

It is also possible to provide for each of the transparent conductive electrodes 22 of the capacitive sensor array 21 being connected to the electronic unit 50 by a first conductor 51 and by a second conductor 52 to form a plurality of closed electrical circuits and enable each transparent conductive electrode 22 of the capacitive sensor array 21 to heat up by Joule effect.

Thus, the electric current management module 53 may be configured to electrically power all of the transparent conductive electrodes 22 of an array, only a predetermined selection of transparent conductive electrodes 22 of an array of capacitive sensors 21, or different selections of transparent conductive electrodes 22, simultaneously or sequentially (per selection or per electrode) to limit the consumption peaks on the energy source 54 while optimising the extent of heating of the internal face 13.1 of the protective glass 13.

It is also possible to consider that all of the transparent conductive electrodes 22 of an array of capacitive sensors 21 will be heated sequentially according to a particular heating pattern.

The invention claimed is:

1. A timepiece comprising a case forming an electrical mass, said case being closed by a back and by a protective glass, said timepiece comprising a tactile control device connected to an electronic unit configured to execute at least one predetermined function of said timepiece under the action of the tactile control device, said tactile control device comprising at least one capacitive sensor comprising a first armature formed by a transparent conductive electrode, formed at least on a portion of an internal face of the protective glass, and a second armature formed selectively by the positioning of the finger of the wearer of said timepiece on an external face of the protective glass; said transparent conductive electrode being electrically connected to said electronic unit by a first electrical conductor;

wherein the timepiece comprises an anti-fog device of said protective glass formed in part by said transparent conductive electrode and by a second electrical conductor connecting said transparent conductive electrode to said electronic unit in a closed circuit, said electronic unit comprising an electric current management module configured to generate a controlled electric current in the closed circuit enabling said transparent conductive electrode to heat up by Joule effect.

2. The timepiece according to claim 1, wherein said transparent conductive electrode is a layer of transparent conductive oxides.

3. The timepiece according to claim 1, wherein said transparent conductive electrode comprises a layer of transparent conductive oxides and at least one layer for optical compensation of said layer of transparent conductive oxides.

4. The timepiece according to claim 2, wherein the layer of transparent conductive oxides is composed of tin-doped indium oxide, aluminium-doped zinc oxide, zinc oxide or fluorine-doped tin dioxide.

5. The timepiece according to claim 1, wherein said transparent conductive electrode is a layer based on silver nanowires.

6. The timepiece according to claim 1, wherein said transparent conductive electrode is a carbon nanotube-based layer.

7. The timepiece according to claim 1, wherein the electric current management module is configured to generate and/or modulate a controlled electric current for heating the transparent conductive electrode as a function of at least one piece of information originating from at least one sensor that the timepiece comprises.

8. The timepiece according to claim 7, wherein the timepiece comprises an accelerometer connected to said electronic unit enabling information on the use of the timepiece to be supplied to the electric current management module.

9. The timepiece according to claim 7, wherein the timepiece comprises a temperature sensor connected to said electronic unit allowing supplying the electric current management module with information on the internal temperature of said timepiece and/or on the temperature of the environment outside the timepiece.

10. The timepiece according to claim 7, wherein the timepiece comprises a humidity sensor connected to said electronic unit enabling information on the humidity inside said timepiece to be supplied to the electric current management module.

11. The timepiece according to claim 1, wherein said tactile control device comprises an array of capacitive sensors and corresponding transparent conductive electrodes covering the internal face of the protective glass, said anti-fog device being formed by at least some of the transparent conductive electrodes of the capacitive sensor array, said at least some of the transparent conductive electrodes of the capacitive sensor array being connected to the electronic unit by a first electrical conductor and by a second electrical conductor to form a plurality of closed electrical circuits, the electric current management module being configured to generate a controlled electric current in each closed circuit of the plurality of closed electrical circuits enabling said at least some of the transparent conductive electrodes of the capacitive sensor array to be heated by Joule effect.

12. The timepiece according to claim 3, wherein the layer of transparent conductive oxides is composed of tin-doped indium oxide, aluminium-doped zinc oxide, zinc oxide or fluorine-doped tin dioxide.

* * * * *